Nov. 4, 1924.

G. S. CASCADDAN

MUD LUG FOR AUTOMOBILE WHEELS

Filed Nov. 19, 1923

1,514,311

Goldy S. Cascaddan
INVENTOR

BY Victor J. Evans
ATTORNEY

WITNESS

Patented Nov. 4, 1924.

1,514,311

UNITED STATES PATENT OFFICE.

GOLDY S. CASCADDAN, OF PONTIAC, MICHIGAN.

MUD LUG FOR AUTOMOBILE WHEELS.

Application filed November 19, 1923. Serial No. 675,733.

*To all whom it may concern:*

Be it known that I, GOLDY S. CASCADDAN, a citizen of the United States, residing at Pontiac, in the county of Oakland and State of Michigan, have invented new and useful Improvements in Mud Lugs for Automobile Wheels, of which the following is a specification.

The object of my said invention is the provision of an efficient lug constructed with a view to being expeditiously and easily attached to and detached from a drive wheel of a motor vehicle; the said lug in use being adapted to increase the traction of a wheel so as to enable the wheel to take better hold of a road and in that way work itself out of mud holes and other bad places in a road.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
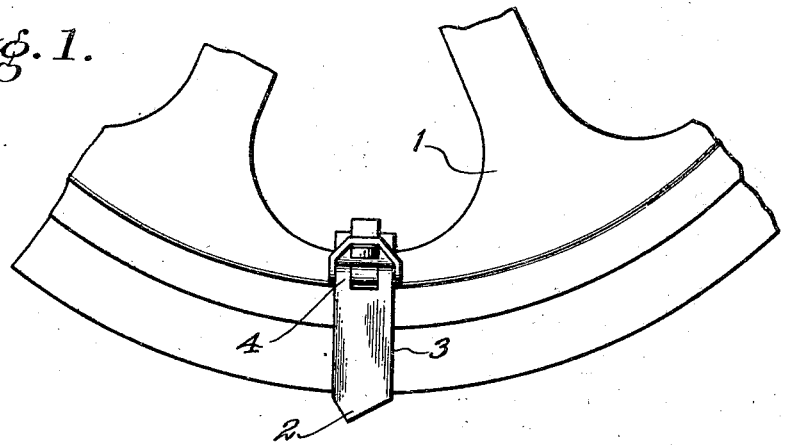
Figure 1 is a side elevation of a portion of a wheel showing my novel lug in working position thereon.
Figure 2:
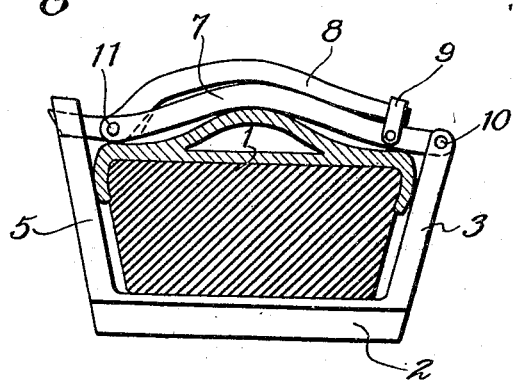
Figure 2 is an enlarged transverse section taken through the rim and tire portion of the wheel and showing my novel lug in elevation.
Figure 3:
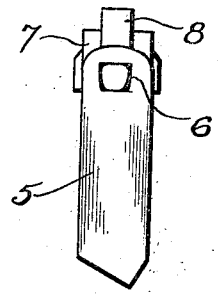
Figure 3 is an elevation showing the end of the lug opposite to that shown in Figure 1.

The wheel illustrated is of the ordinary well known truck type and is numbered 1, the said wheel being one of the drive wheels of a truck and it is obviously advantageous to apply my novel lug to a drive wheel of a motor vehicle.

The novel lug may be made of steel or of any other material compatible with its purpose, and among other elements it comprises an outer bar 2 adapted to rest transversely of the wheel tire at the outer side thereof. The said bar 2 is preferably of triangular form in cross-section and is arranged with its apex outwardly so as to enable it to take better hold of a road. Formed integral with or otherwise appropriately fixed with respect to the outer bar 2 is an end bar 3 which is provided with a bifurcation 4. At the opposite end of the outer bar 2 and appropriately fixed with respect thereto is an end bar 5 in which is an aperture 6. It will be noticed at this point that in the preferred embodiment of my invention the end bars 3 and 5 are slightly divergent as they recede from the bar 2.

In addition to the outer bar 2 and the end bars 3 and 5 which constitute a bail-shaped body, my novel lug comprises a locking bar 7, a latch lever 8 and a bail-shaped adjustable keeper 9 for the said latch lever. The locking bar 7 is reduced at one end and is hingedly connected in the bifurcation 4 of the end bar 3 as designated by 10. The opposite end of the locking bar 7 is bifurcated to receive an intermediate portion of the latch lever 8 which is hinged to the locking bar 7 at the point 11. The forward end portion of the latch lever 8 is preferably reduced to a portion of circular form in cross-section, and it will also be noted that the latch lever 8 is of such angular formation that when the said forward end portion of the latch lever is positioned in the aperture 6 of the end bar 5 the major portion of the inner arm of the latch lever 8 will rest close against the adjacent side of the locking bar 7. The inner arm of the locking bar 7 is preferably tapered toward its free end as illustrated for the better manipulation of the bail-shaped keeper 9 which is hingedly connected at 12 to the opposite edges of the locking bar 7. In the practical use of my novel lug it will be manifest that while the locking bar 7 is positioned with its appurtenances as shown by dotted lines in Figure 4, the lug may be readily placed over or removed from the rim and tire portions of a wheel, and it will also be appreciated that in order to secure the lug on the wheel it is simply necessary to position the outer end of the latch lever 8 in the aperture 6 and move the inner arm of said latch lever 8 against the locking bar 7, and then swing the bail-shaped keeper 9 over the free end of the latch lever so as to fix the same with respect to the locking bar 7. When this operation is carried out it will be apparent that casual release of the lug and displacement of the same from the wheel will be practically precluded as will also the liability of any shifting of the lug on the wheel, it being understood that when the latch lever 8 is manipulated as described the effect will be to securely clamp the tire and rim portions of the wheel between the outer bar 2 and the locking bar 7.

Figure 4:
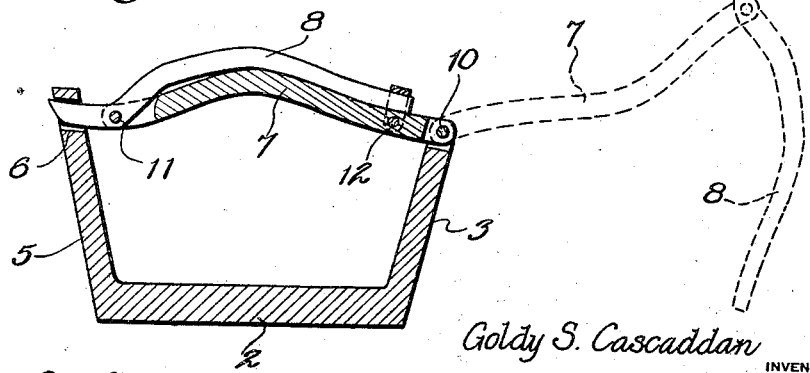
Figure 4 is a longitudinal central section of the lug with the parts in the positions they occupy when the lug is locked about the rim and tire of a wheel, said view also showing by dotted lines the position in which the inner bar of the lug is placed for the application and removal of the lug.

When the lug is secured on a wheel and it is desired to remove the lug it is simply necessary to swing the keeper 9 off the latch lever 8 and then adjust the latch lever 8 to the position shown by dotted lines in Figure 4, after which the locking bar 7 may be readily swung on the end bar 3 for the disengagement of the lug from the tire and rim portions of the wheel.

It will be apparent from the foregoing that notwithstanding its practical advantages and its capacity of function as is indicated, my novel lug is simple and inexpensive in construction and at the same time is well adapted to withstand the rough usage to which traction wheel attachments are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in the appended claims.

Having described my invention, what I claim and desire to secure by Letters-Patent, is:—

1. A mud lug comprising a body having an outer bar and end bars, one of the end bars being bifurcated and the other being provided with an aperture spaced from the outer bar, a locking bar hingedly connected at one end in the bifurcation of one end bar of the body and having a bifurcation in its opposite end, an angular lever fulcrumed at an intermediate point of its length in the bifurcation of the locking bar and having an outer reduced portion of circular form in cross-section and also having an inner tapered arm, and a bail-shaped keeper hingedly connected to the inner portion of the locking bar and adapted to be swung on and off the tapered end portion of the latch lever.

2. A mud lug comprising a body shaped to straddle the tire and rim portions of a wheel and having an aperture in one end, a locking bar hingedly connected to the opposite end of the body, a latch lever fulcrumed at an intermediate point of its length on the locking bar and having an outer portion adapted to be socketed in the said aperture of the body, and a keeper for the latch lever carried by the locking bar and adjustable thereon into and out of engagement with the latch lever.

In testimony whereof I affix my signature.

GOLDY S. CASCADDAN.